(12) United States Patent
Kumar et al.

(10) Patent No.: US 9,665,775 B2
(45) Date of Patent: *May 30, 2017

(54) IDENTIFYING SCENE BOUNDARIES USING GROUP SPARSITY ANALYSIS

(71) Applicant: Kodak Alaris Inc., Rochester, NY (US)

(72) Inventors: Mrityunjay Kumar, Boulder, CO (US); Alexander C. Loui, Penfield, NY (US); Bruce Harold Pillman, Rochester, NY (US)

(73) Assignee: KODAK ALARIS INC., Rochester, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/217,421

(22) Filed: Jul. 22, 2016

(65) Prior Publication Data
US 2016/0328615 A1    Nov. 10, 2016

Related U.S. Application Data

(63) Continuation of application No. 14/622,405, filed on Feb. 13, 2015, now Pat. No. 9,424,473, which is a
(Continued)

(51) Int. Cl.
*G06K 9/00* (2006.01)
*G06K 9/62* (2006.01)
(Continued)

(52) U.S. Cl.
CPC ..... *G06K 9/00765* (2013.01); *G06K 9/00751* (2013.01); *G06K 9/48* (2013.01);
(Continued)

(58) Field of Classification Search
CPC ........... G06K 9/00758; G06K 9/00664; G06K 9/00711; G06K 9/00765; G06K 9/4676;
(Continued)

(56) References Cited

U.S. PATENT DOCUMENTS 5,351,556 A     10/1994  Lew et al.
5,436,653 A *   7/1995   Ellis ................... G06K 9/00711
                                                       725/19
(Continued)

OTHER PUBLICATIONS

Cheung et al., "Video epitomes," Proc. IEEE Conference on Computer Vision and Pattern Recognition, vol. 1, pp. 42-49 (2005).
(Continued)

*Primary Examiner* — Vu Le
*Assistant Examiner* — Aklilu Woldemariam
(74) *Attorney, Agent, or Firm* — Hogan Lovells US LLP

(57) ABSTRACT

A method for identifying a set of key video frames from a video sequence comprising extracting feature vectors for each video frame and applying a group sparsity algorithm to represent the feature vector for a particular video frame as a group sparse combination of the feature vectors for the other video frames. Weighting coefficients associated with the group sparse combination are analyzed to determine video frame clusters of temporally-contiguous, similar video frames. The video sequence is segmented into scenes by identifying scene boundaries based on the determined video frame clusters.

10 Claims, 16 Drawing Sheets

Related U.S. Application Data continuation of application No. 13/565,919, filed on Aug. 3, 2012, now Pat. No. 8,989,503.

(51) Int. Cl.
*G06K 9/48* (2006.01)
*G06K 9/46* (2006.01)

(52) U.S. Cl.
CPC .............. *G06K 9/6249* (2013.01); *G06K 9/00* (2013.01); *G06K 2009/4695* (2013.01)

(58) Field of Classification Search
CPC ....... G06K 9/00744; G06K 2009/4695; G06K 9/6249; G06K 9/34; G06K 9/00221; G06T 2207/10016; G06T 2207/20141; G06T 7/2033; G06T 7/0081; G11B 27/326; G11B 27/28; H04H 60/59; H04H 60/59; H04N 19/149; H04N 19/137; H04N 19/159; H04N 19/23; H04N 19/517; H04N 19/176; H04N 19/57; H04N 19/115; H04N 19/154; H04N 19/65; H04N 19/90; H04N 19/20; G06F 17/30796; G06F 17/30811; G06F 17/30781; G06F 17/30743; G06F 17/30799
USPC ............... 382/173, 197, 199, 224, 225, 305; 375/240; 345/525, 607
See application file for complete search history.

(56) References Cited

U.S. PATENT DOCUMENTS

| | | | | |
|---|---|---|---|---|
| 5,621,454 A * | 4/1997 | Ellis | ................... | G06K 9/00711 725/14 |
| 5,995,095 A * | 11/1999 | Ratakonda | ........ | G06F 17/30802 348/E5.067 |
| 6,393,054 B1 * | 5/2002 | Altunbasak | ............ | G11B 27/28 345/440 |
| 7,016,540 B1 * | 3/2006 | Gong | ................ | G06F 17/30802 348/700 |
| 7,751,473 B2 * | 7/2010 | Hannuksela | ........... | H04N 19/70 375/240 |
| 8,311,344 B2 * | 11/2012 | Dunlop | .............. | G06K 9/00664 382/224 |
| 8,400,566 B2 * | 3/2013 | Terry | ................. | G06K 9/00221 348/192 |
| 2003/0035484 A1 * | 2/2003 | Prakash | ................... | G06T 9/001 375/240.25 |
| 2003/0234805 A1 * | 12/2003 | Toyama | ................ | G06F 3/0481 715/723 |
| 2004/0170321 A1 * | 9/2004 | Gong | ................ | G06F 17/30802 382/173 |
| 2004/0233987 A1 * | 11/2004 | Porikli | ..................... | G06K 9/34 375/240.16 |
| 2006/0280365 A1 * | 12/2006 | Gong | ................ | G06F 17/30802 382/173 |
| 2009/0154807 A1 * | 6/2009 | Rossato | ................... | G06K 9/38 382/173 |
| 2009/0208106 A1 * | 8/2009 | Dunlop | .............. | G06K 9/00664 382/173 |
| 2010/0245670 A1 * | 9/2010 | Takeda | ...................... | G06T 3/40 348/607 |
| 2011/0222787 A1 * | 9/2011 | Thiemert | .......... | G06F 17/30802 382/225 |
| 2011/0292288 A1 | 12/2011 | Deever | | |
| 2011/0293018 A1 | 12/2011 | Deever | | |
| 2012/0099793 A1 | 4/2012 | Kumar et al. | | |
| 2012/0148149 A1 * | 6/2012 | Kumar | ............... | G06K 9/00711 382/162 |
| 2012/0148157 A1 | 6/2012 | Kumar et al. | | |

OTHER PUBLICATIONS

Petrovic et al., "Recursive estimation of generative models of video" Proc. IEEE Conference on Computer Vision and Pattern Recognition, vol. 1, pp. 79-86, 2006.

Peng et al., "RASL: Robust alignment by sparse and low-rank decomposition for linearly correlated images," Proc. EEE Conference on Computer Vision and Pattern Recognition, pp. 763-770 (2010).

Uchihashi et al., "Summarizing video using a shot importance measure and a frame-packing algorithm," in Proc. IEEE International Conference on Acoustics, Speech, and Signal Processing, vol. 6, pp. 3041-3044 (1999).

Rasheed et al., "Detection and representation of scenes in videos," IEEE Trans. Multimedia, vol. 7, pp. 1097-1105 (2005).

Costello et al., "First and third-party ground truth for key frame extraction from consumer video clips," in Proc. SPIE 6492, pp. 64921N (2007).

Luo et al., "Towards extracting semantically meaningful key frames from personal video clips: from humans to computers," IEEE Trans. Circuits Syst. Video Technol., vol. 19, pp. 289-301 (2009).

Dimitrova et al., "Video keyframe extraction and filtering: a keyframe is not a keyframe to everyone," Proc. Sixth International Conference on Information and Knowledge Management, pp. 113-120 (1997).

Baraniuk et al., "Random projections of smooth manifolds," Foundations of Computational Mathematics, vol. 9, pp. 51-77 (2009).

Hedge et al., "Random projections for manifold learning," Advances in Neural Informational Processing Systems, pp. 641-649 (2007).

Fern et al., "Solving cluster ensemble problems by bipartite graph partitioning," Proc. 21st International Conference on Machine Learning, 2004.

Romdhani et al., "Computationally Efficient Face Detection," Proc. 8th International Conference on Computer Vision, pp. 695-700 (2001).

Liu et al., "Noise estimation from a single image," IEEE Conference on Computer Vision and Pattern Recognition, pp. 901-908 (2001).

Ferzli et al., "A no-reference objective image sharpness metric based on just-noticeable blue and probability summation," IEEE International Conference on Image Processing, vol. III, pp. 445-448 (2007).

Vailaya et al., "On image classification: city images vs. landscapes," Pattern Recognition, vol. 31, pp. 1921-1935 (1998).

Lowe, "Distinctive image features from scale invariant keypoints," International Journal of Computer Vision, vol. 60, pp. 91-110 (2004).

Ng et al., "On spectral clustering: Analysis and an algorithm," Advance in Neural Information Processing Systems 14, vol. 2 (2002).

Kanungo et al., "An efficient k-means clustering algorithm: analysis and implementation," IEEE Transactions on Pattern Analysis and Machine Intelligence, vol. 24, No. 7, pp. 881-892 (2002).

Baron et al., "Distributed compressive sensing," preprint 2005.

Sankaranarayanan et al., "Compressive acquisition of dynamic scenes," Proc. 11th European Conference on Computer Vision, pp. 129-142 (2010).

Nagesh et al., "A compressive sensing approach for expression-invariant face recognition," Proc. IEEE Conference on Computer Vision and Pattern Recognition, pp. 1518-1525 (2009).

Brown, "A survey of image registration techniques," ACM Computing Surveys, vol. 24, issue 4, pp. 325-376 (1992).

Bruckstein et al., "From sparse solutions of systems of equations to sparse modeling of signals and images," SIAM Review, pp. 34-81 (2009).

Aharon et al., "K-SVD: An algorithm for designing overcomplete dictionaries for sparse representation," IEEE Transactions on Signal Processing, vol. 54, pp. 4311-4322 (2006).

\* cited by examiner

IDENTIFYING SCENE BOUNDARIES USING GROUP SPARSITY ANALYSIS

CROSS-REFERENCE TO RELATED APPLICATIONS

This application is a continuation of U.S. application Ser. No. 14/622,405, filed Feb. 13, 2015, which is a continuation of, and claims priority to, U.S. application Ser. No. 13/565,919, filed Aug. 3, 2012, now U.S. Pat. No. 8,989,503, issued on Mar. 24, 2015, each of which is hereby incorporated by reference in its entirety. This application is also related to U.S. patent application Ser. No. 13/413,962, entitled: "Video representation using a sparsity-based model", by Kumar et al., now U.S. Pat. No. 8,982,958; to commonly assigned U.S. patent application Ser. No. 13/413,982, entitled "Scene boundary determination using sparsity-based model," by Kumar et al., now U.S. Pat. No. 8,976,299; to commonly assigned U.S. patent application Ser. No. 13/565,911, entitled "Identifying key frames using group sparsity analysis," by Kumar et al., now U.S. Pat. No. 8,913,835; and to commonly assigned, co pending U.S. patent application Ser. No. 13/565,926, entitled "Video summarization using group sparsity analysis," by Kumar et al., now U.S. Pat. No. 9,076,043; each of which is incorporated herein by reference.

FIELD OF THE INVENTION

This invention pertains to the field of video processing, and more particularly to the identification of scene boundaries in a video sequence using group sparsity analysis.

BACKGROUND OF THE INVENTION

With the development of digital imaging and storage technologies, video clips can be conveniently captured by consumers using various devices such as camcorders, digital cameras or cell phones and stored for later viewing and processing. Efficient content-aware video representation models are critical for many video analysis and processing applications including denoising, restoration, and semantic analysis.

Developing models to capture spatiotemporal information present in video data is an active research area and several approaches to represent video data content effectively have been proposed. For example, Cheung et al. in the article "Video epitomes" (Proc. IEEE Conference on Computer Vision and Pattern Recognition, Vol. 1, pp. 42-49, 2005), teach a patch-based probability models to represent video content. However, their model does not capture spatial correlation.

In the article "Recursive estimation of generative models of video" (Proc. IEEE Conference on Computer Vision and Pattern Recognition, Vol. 1, pp. 79-86, 2006), Petrovic et al. teach a generative model and learning procedure for unsupervised video clustering into scenes. However, they assume videos to have only one scene. Furthermore, their framework does not model local motion.

Peng et al., in the article "RASL: Robust alignment by sparse and low-rank decomposition for linearly correlated images" (Proc. IEEE Conference on Computer Vision and Pattern Recognition, pp. 763-770, 2010), teach a sparsity-based method for simultaneously aligning a batch of linearly correlated images. Clearly, this model is not suitable for video processing as video frames, in general, are not linearly correlated.

Key frame extraction algorithms are used to select a subset of the most informative frames from a video, with the goal of representing the most significant content of the video with a limited number of frames. Key frame extraction finds applications in several broad areas of video processing such as video summarization, creating "chapter titles" in DVDs, video indexing, and making prints from video. Key frame extraction is an active research area, and many approaches for extracting key frames from videos have been proposed.

Conventional key frame extraction approaches can be loosely divided into two groups: (i) shot-based, and (ii) segment-based. In shot-based key frame extraction, the shots of the original video are first detected, and one or more key frames are extracted for each shot (for example, see: Uchihashi et al., "Summarizing video using a shot importance measure and a frame-packing algorithm," in Proc. IEEE International Conference on Acoustics, Speech, and Signal Processing, Vol. 6, pp. 3041-3044, 1999). In segment-based key frame extraction approaches, a video is segmented into higher-level video components, where each segment or component could be a scene, an event, a set of one or more shots, or even the entire video sequence. Representative frame(s) from each segment are then selected as the key frames (for example, see: Rasheed et al., "Detection and representation of scenes in videos," IEEE Trans. Multimedia, Vol. 7, pp. 1097-1105, 2005).

Existing key frame selection approaches, both shot-based as well as segment-based, are usually suitable for structured videos such as news and sports videos. However, they are sub-optimal for consumer videos as these videos are typically captured in an unconstrained environment and record extremely diverse content. Moreover, consumer videos often lack a pre-imposed structure, which makes it even more challenging to detect shots or segment such videos for key frame extraction (see: Costello et al., "First- and third-party ground truth for key frame extraction from consumer video clips," in Proc. SPIE 6492, pp. 64921N, 2007 and Luo et al., "Towards extracting semantically meaningful key frames from personal video clips: from humans to computers," IEEE Trans. Circuits Syst. Video Technol., Vol. 19, pp. 289-301, 2009).

There remains a need for robust and efficient methods to process digital video sequences captured in an unconstrained environment to perform tasks such as identifying key frames, identifying scene boundaries and forming video summaries.

SUMMARY OF THE INVENTION

The present invention represents a method for determining scene boundaries within a video sequence including a time sequence of video frames, each video frame including an array of image pixels having pixel values, comprising:

a) selecting a set of video frames from the video sequence;

b) extracting a feature vector for each video frame in the set of video frames;

c) applying a group sparsity algorithm to represent the feature vector for a particular video frame as a group sparse combination of the feature vectors for the other video frames in the set of video frames, each feature vector for the other video frames in the group sparse combination having an associated weighting coefficient, wherein the weighting coefficients for feature vectors corresponding to other video frames that are most similar to the particular video frame are non-zero, and the weighting coefficients for feature vectors corresponding to other video frames that are most dissimilar from the particular video frame are zero;

d) analyzing the weighting coefficients to determine a video frame cluster of temporally-contiguous, similar video frames that includes the particular video frame;

e) repeating steps c)-d) for a plurality of particular video frames to provide a plurality of video frame clusters;

f) identifying one or more scene boundaries corresponding scenes in the video sequence based on the locations of boundaries between the determined video frame clusters; and g) storing an indication of the identified scene boundaries in a processor-accessible memory;

wherein the method is performed, at least in part, using a data processor.

This invention has the advantage that it does not require performing computationally intricate steps such as camera motion estimation, global motion estimation, and shot detection for determining key frames from a video. Feature selection, which can be a difficult task, has been found to be less critical in this framework. In addition, the group sparsity approach has the advantage that the group sparse solver is invoked once for each group, which greatly reduces the computational complexity compared to other sparsity approaches that compute a set of sparse coefficients for each frame of the video. As such the determination of video segments is more efficient with this method.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
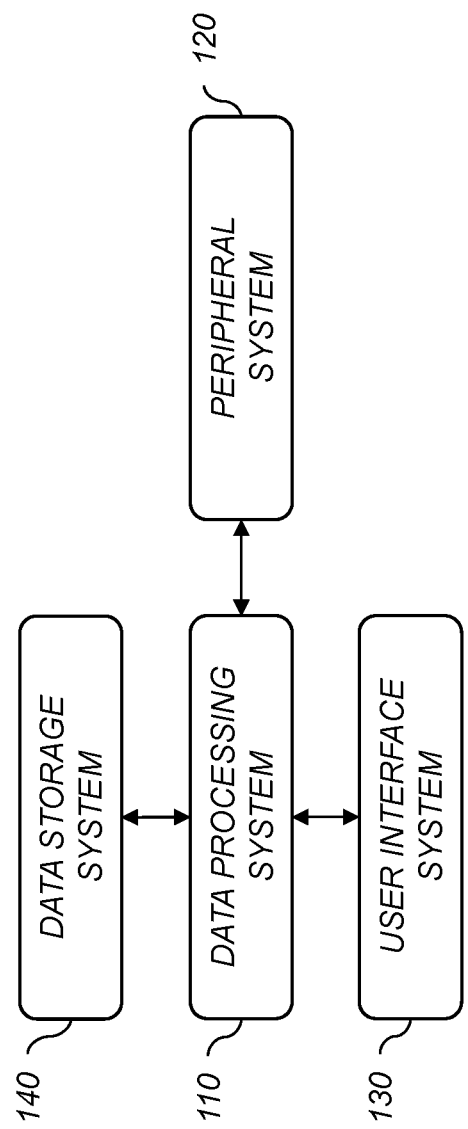
FIG. 1 is a high-level diagram showing the components of a system according to an embodiment of the present invention.

FIG. 1 is a high-level diagram showing the components of a system for identifying a set of key video frames from a video sequence according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

Sparse representation, a signal processing model inspired by the human visual system (HVS), has gained tremendous attention recently to determine the sparsest information that compactly represents the data at hand. The goal of key frame extraction is to identify the sparsest number of frames required to represent the input video. Applicants have recognized that sparse representation methods can be leverage to design efficient video processing algorithms, such as key frame extraction, scene boundary detection and video summarization.

An embodiment of the present invention will now be described with reference to FIG. 2, which illustrates a flow chart of a method for selecting key video frames 265 using a sparse representation process. The input to the process is a video sequence 200 including a time sequence of video frames, each video frame including an array of image pixels having pixel values. A select set of video frames step 202 is used to select a set of video frames 205 including N individual video frames 210 ($F_1$-$F_N$). The set of video frames 205 may comprise all of the video frames in the video sequence 200, or they may be a subset.

For cases where the select set of video frames step 202 selects only a subset of the video frames in the video sequence 200, the subset may be selected using several methods. In some embodiments, a user interface can be provided to enable a user to manually indicate a starting point and an ending point for the set of video frames 205.

Each video frame in the video sequence 200 typically requires over 600,000 bytes of storage. As a result, to reduce memory usage and improve computational efficiency, in some embodiments it can be advantageous to temporally sub-sample the video sequence 200 to select a subset of the video frames 210 separated by a predefined interval (for example, every tenth video frame in the video sequence 200). In some cases, the input video sequence 200 is stored in as a compressed video stream using a scheme where some video frames are encoded independently, and other video frames are encoded using inter-frame coding. In such cases, it can be advantageous to select video frames 210 that are coded independently of other video frames in order to make the extraction of the image data more efficient.

In some embodiments, the select set of video frames step 202 may also perform additional processing operations. For example, the video frames 210 can be spatially sub-sampled to a lower spatial resolution to reduce the number of pixels that must be analyzed.

Much of the image data in each video frame 210 is redundant; the present invention projects each video frame 210 to a lower-dimensional feature space for further processing. An extract feature vectors step 215 is used to analyze the video frames 210 to determine corresponding feature vectors 220 ($V_1$-$V_N$). Any method for extracting feature vectors known in the art can be used in accordance with the present invention. Some examples of other types of features that can be used here include edge direction histograms as described by Vailaya et al. in the article "On image classification: City images vs. landscapes" (Pattern Recognition, vol. 31, pp. 1921-1935, 1998), and SIFT features as described by Lowe in the article "Distinctive image features from scale invariant keypoints" (International Journal of Computer Vision, vol. 60, pp. 91-110, 2004).

Figure 3:
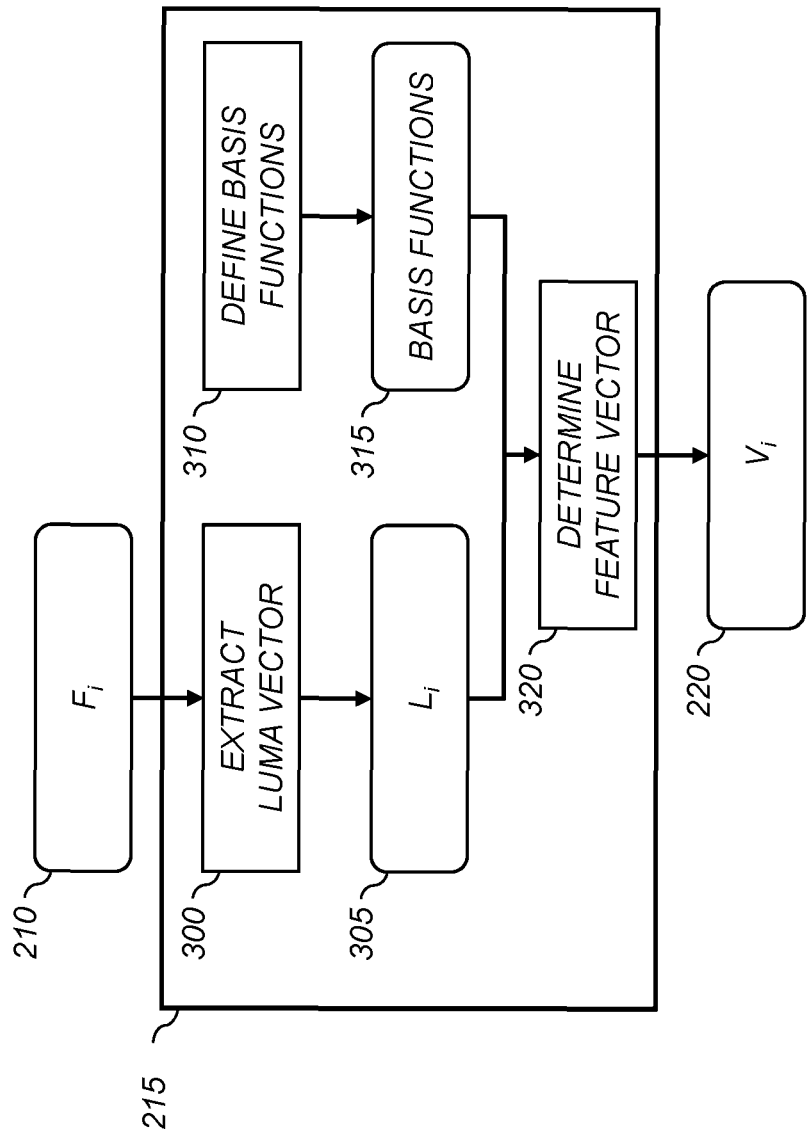
FIG. 3 is a diagram showing further detail for the extract feature vectors step of FIG. 2.

FIG. 3 shows additional details of the extract feature vectors step 215 according to a preferred embodiment in which extracts the feature vectors 220 are extracted using a set of m basis functions 315 ($\Phi_j$). The basis functions are defined using a define basis functions step 310. The features vectors 220 in this case will be used to group similar video frames based on the "relative distance") between pairs of frames, and are not for detailed color for spatial analysis. As discussed by Baraniuk et al. in the article "Random projections of smooth manifolds" (Foundations of Computational Mathematics, Vol. 9, pp. 51-77, 2009) and by Hegde et al. in the article "Random projections for manifold learning" (Advances in Neural Information Processing Systems, pp. 641-649, 2007), both of which are incorporated herein by reference, projections using random basis vectors preserve the relative distance between the video frames in a low-dimensional space. This makes such random projection a good choice for feature extraction within the proposed sparsity based key-frame extraction method. In other embodiments, different sets of basis functions 315 can be used, such as Fourier transform basis functions, discrete cosine transform basis functions, or wavelet basis functions.

In a preferred embodiment, the feature vectors 200 are determined based on luma data for the video frames 210 since most of the spatial detail will be in the luma channel. An extract luma vector step 300 is used to extract a luma vector 305 for each of the video frames 210. For example, the luma channel of the $i^{th}$ video frame 210 ($F_i$) is extracted and arranged in lexicographic order to provide a corresponding one-dimensional luma vector 305 ($L_i$) for each frame. The luma vector 305 ($L_i$), has length n, where n is the number of pixels in the video frame 210. In some embodiments, the size of the video frame 210 is reduced before forming the luma vector 305 by selecting a subset of the image pixels. In this way, the amount of calculations that need to be performed can be reduced. For example, a subset of the image pixels corresponding to a central region of the video frame can be "cropped" out of the video frame 210. Alternately, the video frame 210 can be spatially sub-sampled to provide a smaller image including a subset of the image pixels before forming the luma vector 305. The sub-sampling process can be performed according to a regular grid (e.g., every third image pixel) to provide a lower spatial resolution image, or can be according to some other predefined sampling pattern.

In other embodiments, the green channel of each video frame 210 can be extracted instead of the luma channel. Alternately, other individual color channels (in any appropriate color space such as RGB or $YC_rC_b$), or pixel values for a plurality color channels can be used.

Figure 4:
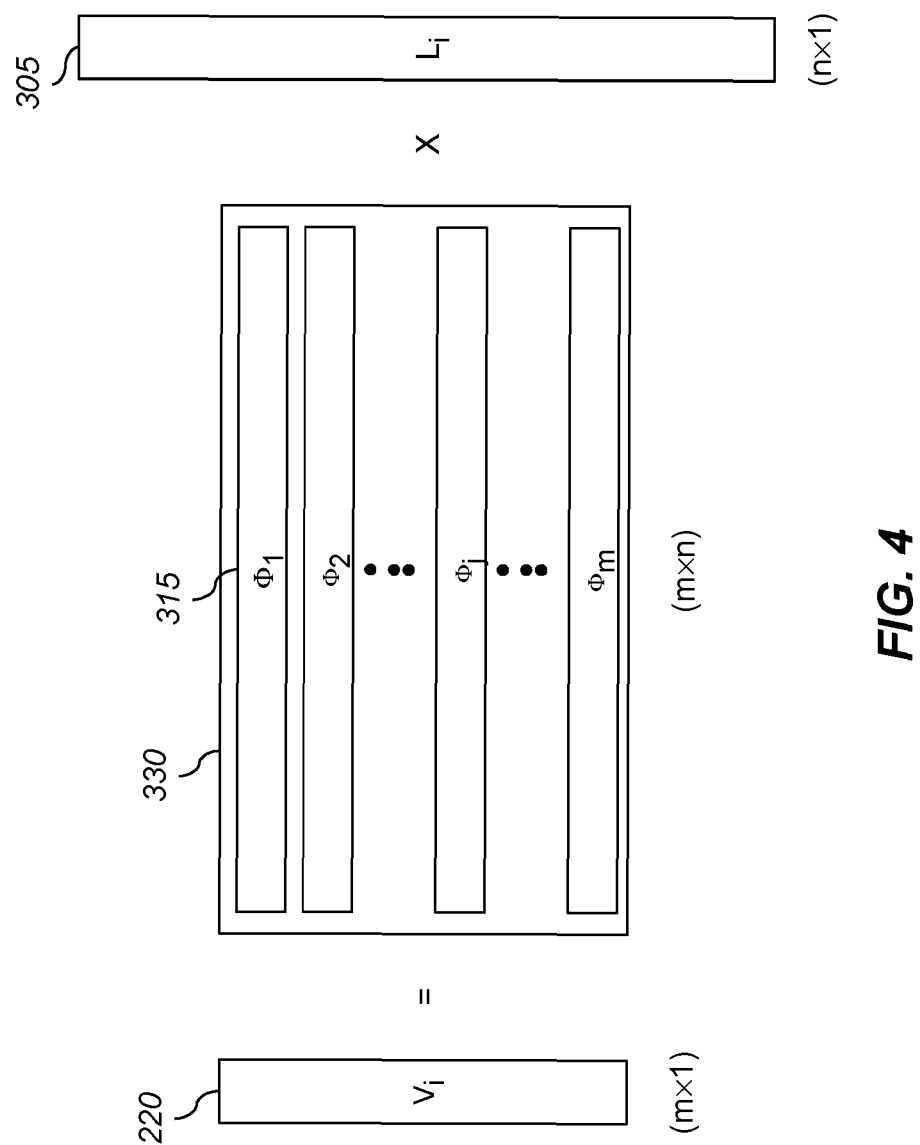
FIG. 4 is a diagram illustrating the use of a projection matrix to determine a feature vector for a video frame.

A determine feature vectors step 320 is used to determine the feature vectors 220 ($V_i$) by projecting the luma vector 305 onto the basis functions 315 to reduce the dimensionality of video frame information. As illustrated in FIG. 4, this can be accomplished by multiplying the luma vector 300 by a projection matrix 330, where the rows of the projection matrix 330 are the basis functions 315, which, in a preferred embodiment, are random vectors. The projection matrix 330 $\Phi \in \Re^{m \times n}$ has as many columns, n, as the length of the luma vector 305. The number of rows, m, defines the length of the feature vector produced. (For the case where the video frame 210 has a VGA resolution, n=307,200.) To achieve efficiency, m<<n (e.g., m=100) so that the feature vector 220 provided by the matrix multiplication provides is much shorter than the original luma vector 210. This process can be represented in equation form as:

$$V_i = \Phi L_i \quad (1)$$

where $V_i$ is the $i^{th}$ feature vector 220, $L_i$ is the $i^{th}$ luma vector 305, and $\Phi$ is the projection matrix 330.

It is important to select m appropriately. In a preferred embodiment, the "greedy" approach described by Dimitrova et al., in the article "Video keyframe extraction and filtering: a keyframe is not a keyframe to everyone" (Proc. Sixth International Conference on Information and Knowledge Management, pp. 113-120, 1997), which is incorporated herein by reference, is used to determine m. This approach exploits minimum video length as a cue to determine an appropriate value of m, and has been empirically verified to be effective. In alternate embodiments, other methods for selecting m can be used. For example, Rasheed et al., in the aforementioned article "Detection and representation of scenes in videos," have described a rather elegant, but computationally expensive, method for selecting m that can be used in accordance with the present invention.

In a preferred embodiment, each basis vector 315 in the projection matrix 330 contains elements that are independently chosen from a normal distribution with a mean of zero and unit variance. In a preferred embodiment, the values in projection matrix basis vector 315 are quantized to −1 and +1, allowing simpler and faster multiplication than with integer or rational coefficients.

Compared to traditional approaches for feature extraction, there are two distinct advantages of using feature vectors 220 extracted using random projections: (i) the feature selection process is less critical (no color or spatiotemporal analysis required), and (ii) computational efficiency as it involves only a matrix multiplication operation.

Figure 2:
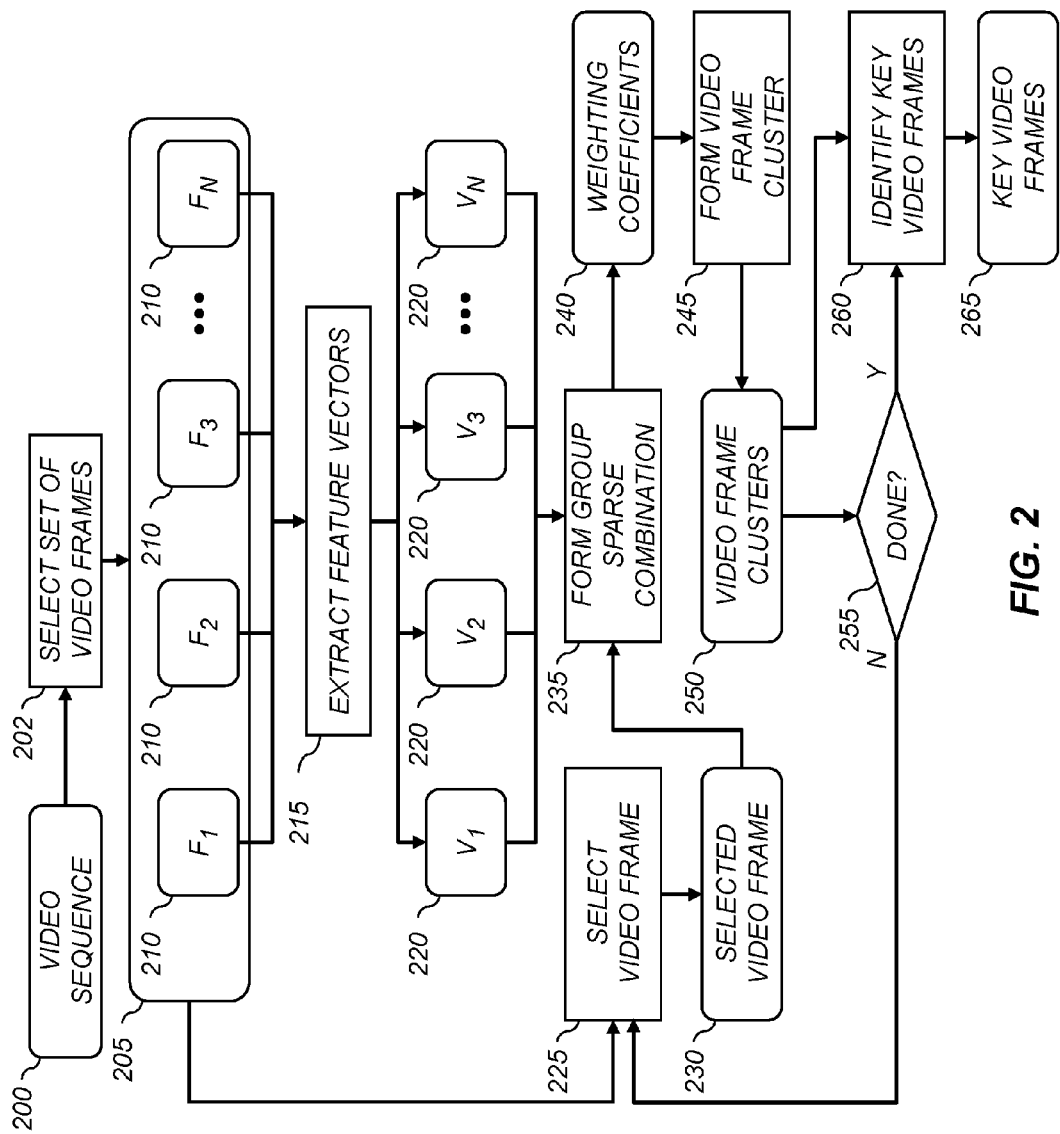
FIG. 2 is a flowchart of a method for selecting key video frames according to a an embodiment of the present invention.

Returning to a discussion of FIG. 2, the feature vectors 220 $V_i$ are used to form video frame clusters 250 including groups of similar video frames 210. Preferably, the video frame clusters 250 are disjoint subsets such that every video frame 210 is a member of one and only one subset.

In a preferred embodiment, an iterative process is used to form the video frame clusters 250. A select video frame step 225 is used to select a selected video frame 230 ($F_i$) to be used as the first video frame in a particular video frame cluster. For the first iteration, the first video frame 210 ($F_1$) is generally designated to be the selected video frame 230. For following iterations, the selected video frame 230 is designated to be the next video frame 210 not included in the previous video frame cluster 250.

A form group sparse combination step 235 is used to represent the feature vector for the selected video frame ($V_i$) as a group sparse combination of the feature vectors 220 ($V_1, \ldots, V_{i-1}, V_{i+1}, \ldots, V_N$) corresponding to the other video frames 210 in the set of video frames 205. In a preferred embodiment, the form group sparse combination step 235 uses a group sparse solver to compute weighting coefficients 240 ($W_1, \ldots, W_{i-1}, W_{i+1}, \ldots, W_N$) for the features vectors 220 corresponding to each of the other frames in the set of video frames 205. This is generally accomplished by concatenating the feature vectors 220 ($V_1, \ldots, V_{i-1}, V_{i+1}, \ldots, V_N$) for all video frames 210 except the selected frame into a large matrix. The group sparse solver returns a vector of weighting coefficients 240 indicating the significance of each video frame 210 in expressing the feature vector 220 ($V_i$) for the selected video frame 230.

A characteristic of group sparse solvers is that the weighting coefficients 240 for feature vectors 220 corresponding to other video frames 210 that are significantly dissimilar to the selected video frame 230 are set to zero, whereas the weighting coefficients 240 for feature vectors 220 corresponding to other video frames 210 that are similar to the selected video frame 230 will be non-zero. Typically, weighting coefficients having a magnitude below a predefined threshold and are set to zero, where the predefined threshold is chosen to correspond to feature vectors 220 that provide no significant contribution.

Figure 5:
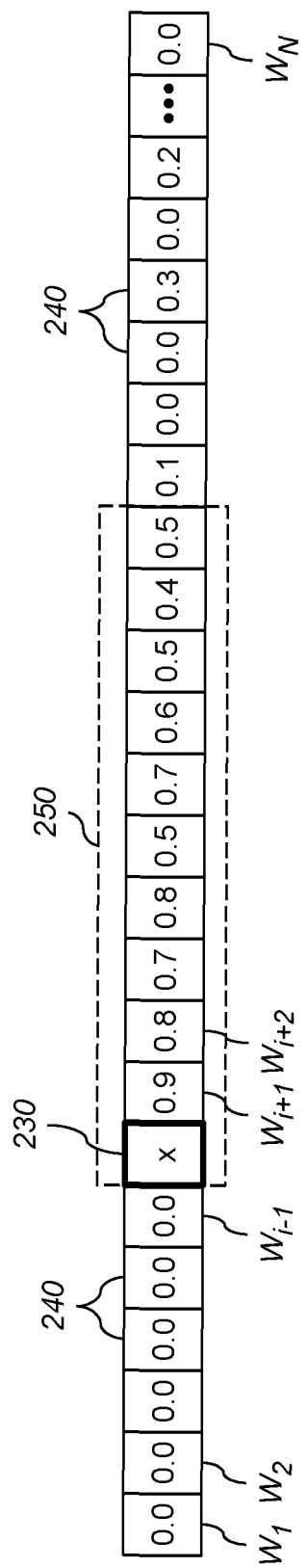
FIG. 5 is a diagram showing an exemplary sequence of weighting coefficients determined for a selected video frame.

FIG. 5 illustrates an exemplary vector of weighting coefficients 240, determined for the $i^{th}$ video frame 210 $F_i$. Typically, the closer that a particular video frame 210 is to the selected video frame 230, the more likely it will be that it will have a high degree of similarity, and consequently the determined weighting coefficients 240 will generally be higher. Conversely, the farther that the particular video frame 210 is from the selected video frame 230, the less likely it will be that it will have a high degree of similarity, and consequently the determined weighting coefficients 240 will generally be lower and there will be a larger number of weighting coefficients 240 that are zeroed out by the group sparse solver. In some embodiments, the weighting coefficients 240 corresponding to the video frames 210 before the selected video frame 230 (i.e., $W_1, \ldots, W_{i-1}$) are automatically set to zero, because they correspond to video frames 210 already grouped into video frame clusters 250. Typically, the weighting coefficients 240 are normalized such that identical video frames 210 would have a weighting coefficient of 1.0.

A form video frame cluster step 245 is used to analyze the weighting coefficients 240 to form a video frame cluster 250 which starts with the selected video frame 230. In a preferred embodiment, the form video frame cluster step 245 starts with the $(i+1)^{th}$ weighting coefficient 240 ($W_{i+1}$) and searches in the forward direction until an insignificant weighting coefficient 240 is found. In some embodiments, an insignificant weighting coefficient 240 is defined to be a weighting coefficient 240 having a value of zero. In a preferred embodiment, an insignificant weighting coefficient 240 is defined to be one having a magnitude of less than a predefined threshold (e.g., 0.2). The video frame cluster 250 is then defined to include the contiguous series of video frames 210 starting with the selected video frame 230 and ending with the video frame 210 prior to the first insignificant weighting coefficient 240 are grouped together to form.

A done test 255 tests if all video frames 210 in the set of video frames 205 have been grouped into video frame clusters 250. If not, then another iteration is performed to determine the next video frame cluster 250, in which the select video frame step 225 selects the next video frame 210 not already grouped into a video frame cluster 250 to be used as the selected video frame 230. In this way, each video frame 210 will be assigned to a video frame cluster, and the determined video frame clusters 250 will be temporally non-overlapping.

Once the done test 255 determines that all of the video frames 210 in the set of video frames 205 have been assigned to video frame clusters 250, processing proceeds to an identify key video frames step 260, where a set of key video frames 265 is selected based on the video frame clusters 250. Any method for selecting a key video frame 265 can be used in accordance with the present invention.

Figure 6:
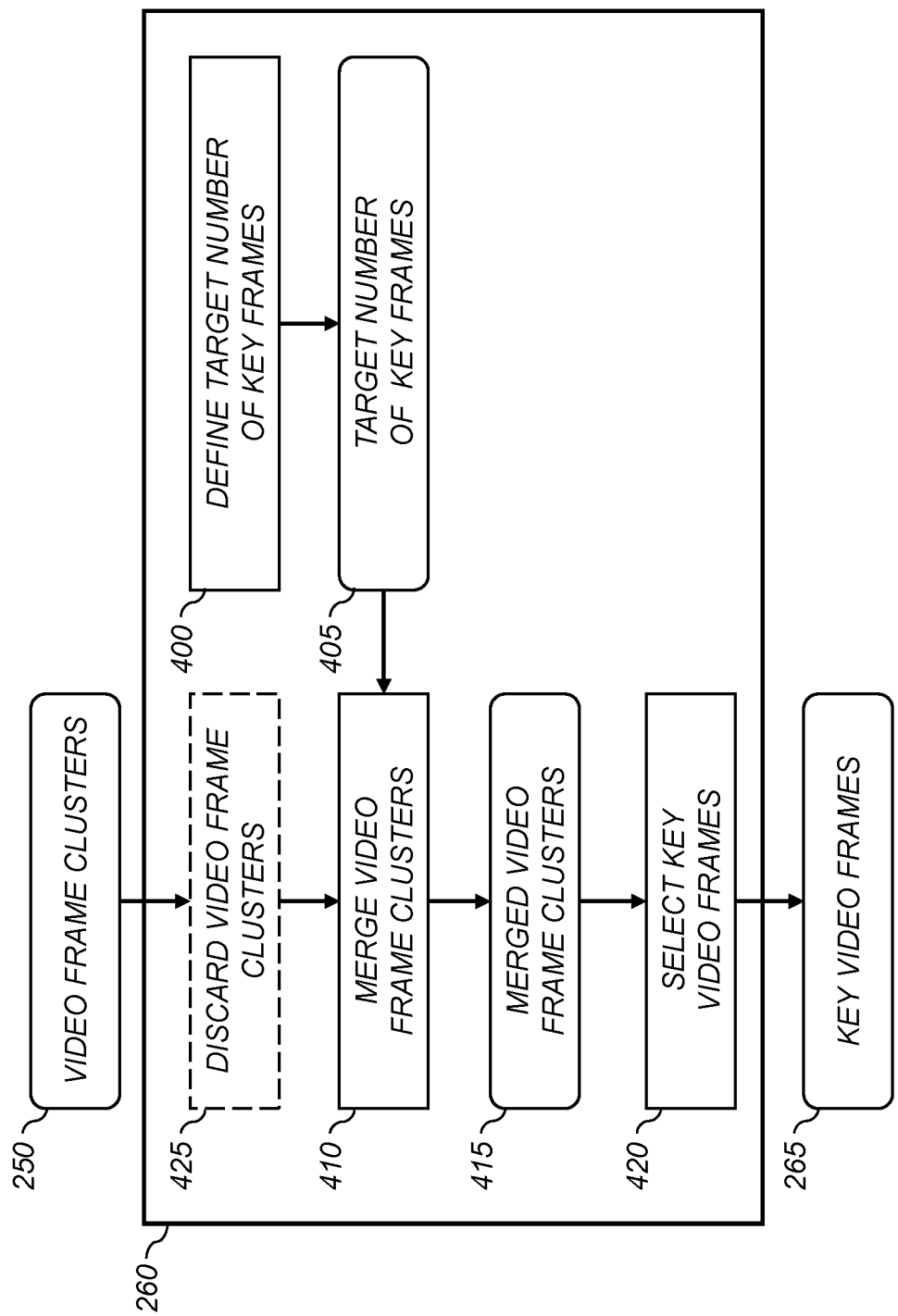
FIG. 6 is a diagram showing further detail for the identify key video frames step of FIG. 2.

In some embodiments, a key video frame 265 can be selected for each video frame cluster 250. However, in many applications, it will be desirable to select a certain number of key video frames, which will generally be less than the number of video frame clusters 250. FIG. 6 shows additional details for the identify key video frames step 260 according to a preferred embodiment where a particular number of key video frames 265 are selected.

A define target number of key frames step 400 is used to define a target number of key frames 405. In a preferred embodiment, the target number of key frames 405 is defined based on the number of video frames 210 (FIG. 2) in the selected set of video frames 205 (FIG. 2), for example using a nonlinear function such as $$T=T_{min}+S^{\gamma} \quad (2)$$

where T is the target number of key frames 405, $T_{min}$ is a minimum number of key frames, such as 3, S is the number of video frames 210 in the set of video frames 205, and γ is a power between 0.0 and 1.0 (e.g., 0.5). This target number of key frames can also be a function of an estimate of how interesting the video is, for example as described in commonly-assigned U.S. Patent Application 2011/0292288 to Deever, entitled "Method for determining key video," which is incorporated herein by reference.

Other methods for defining the target number of key frames 405 can be used as well. For example, a user interface can be provided to enable a user to manually specify a desired target number of key frames 405. In other applications, the target number of key frames 405 can be a constant that is independent of the number of video frames 210.

In a preferred embodiment, a merge video frame clusters step 410 is used to merge groups of video frame clusters 250 to provide T merged video frame clusters 415, where T is the target number of key frames 405.

Figure 7:
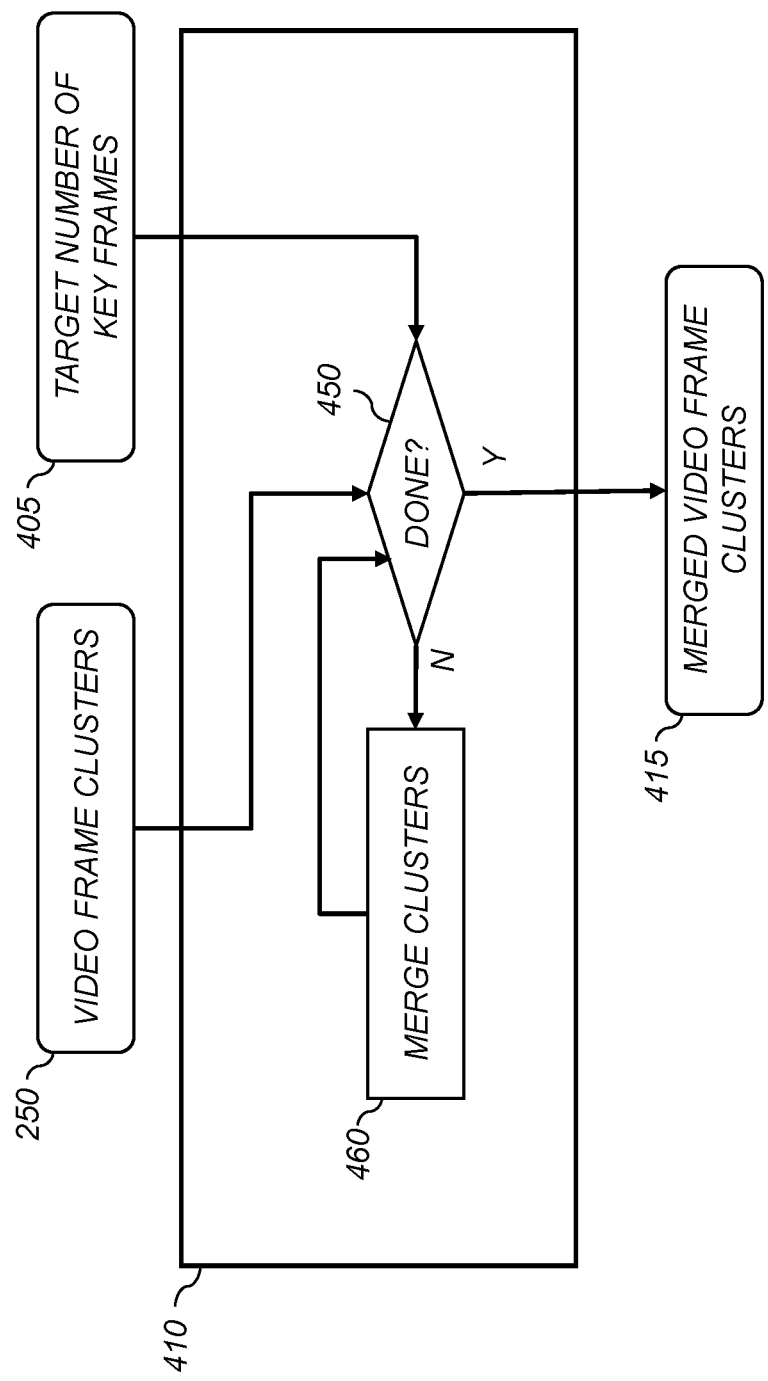
FIG. 7 is a diagram showing further detail for the merge video frame clusters step of FIG. 6.

FIG. 7 shows additional details of the merge video frame clusters step 410 according to a preferred embodiment. A done test 450 compares the number of video frame clusters 250 with the target number of key frames 405 (T). If the number of video frame clusters 250 is less than or equal to the target number of key frames 405, the merge video frame clusters step 410 is complete and the merged video frame clusters 415 are passed to the next step in FIG. 6. In some cases, the original number of video frame clusters 250 may be less than the target number of key frames 405. In such cases, the target number of key frames 405 can be adjusted to equal the original number of video frame clusters 250.

If the number of video frame clusters 250 is greater than the target number of key frames 405, a merge clusters step 460 is used to merge two (or more) of the video frame clusters 250, and control then returns to done test 450. Many methods for clustering can be used to determine which video frame clusters 250 should be merged. Preferably, the video frame clusters 250 that are most similar are merged. In some embodiments, a constraint is imposed that the video frame clusters 250 which are merged are temporally-contiguous with each other. However, in other embodiments, this constraint is relaxed to cover the case where similar image content may be found in different sections of a video sequence 200. Generally, the temporal order of the video frames 210 in the merged video frame clusters 415 should be preserved.

In a preferred embodiment, the merge clusters step 460 identifies the video frame clusters 250 to be merged using the hybrid bipartite graph partitioning algorithm proposed by Fern et al., in the article "Solving cluster ensemble problems by bipartite graph partitioning" (Proc. 21st International Conference on Machine Learning, 2004), which is incorporated herein by reference.

Figure 8:
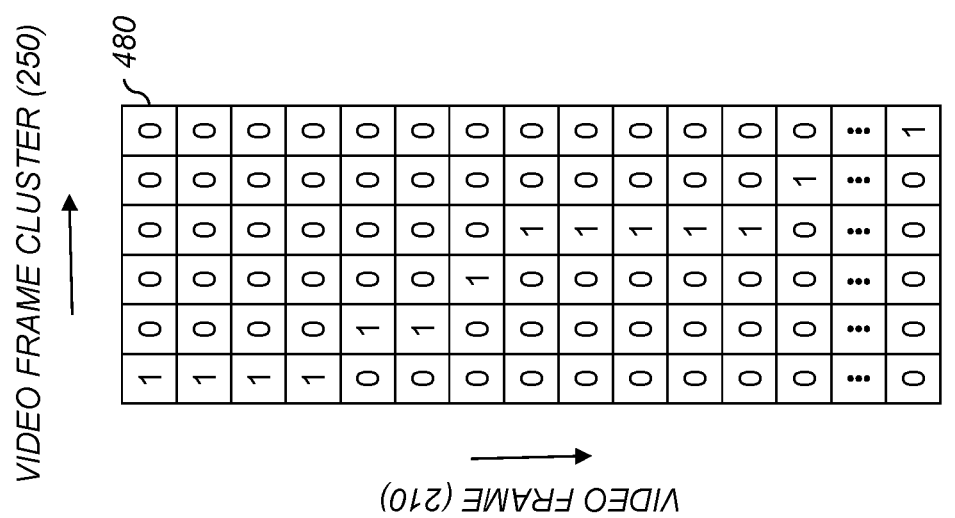
FIG. 8 is a diagram showing formation of a connectivity matrix used for hybrid bipartite graph partitioning.

This approach begins by forming an adjacency matrix 480 as illustrated in FIG. 8. Each video frame 210 is represented by a row in the matrix. Each video frame cluster 250 is represented by a column in the adjacency matrix 480. For each row of the matrix, there is a 1 in the column representing the video frame cluster 250 to which it belongs. All other entries in the row are 0.

The hybrid bipartite graph formulation represents the cluster membership with a bipartite graph, with one set of vertices representing video frames 210 and the other representing video frame clusters 250. This is done by taking the adjacency matrix 480 (A) and using it to form a matrix W, as shown:

$$W = \begin{bmatrix} 0 & A^T \\ A & 0 \end{bmatrix} \quad (3)$$

If the vertices i and j are both clusters or both instances, W(i, j)=0; otherwise if instance i belongs to cluster j, W(i, j)=W(j, i)=1, and 0 otherwise. This graph can then be partitioned using several techniques. In a preferred embodiment, a spectral graph partitioning algorithm by Ng et al. in the article "On spectral clustering: Analysis and an algorithm" (Advances in Neural Information Processing Systems 14, Vol. 2, 2002), which is incorporated herein by reference, is used. Given the graph G=(V, W), where V is the union of the set of vertices representing the frames and the set of vertices representing clusters and W is given by Eq. (3), the algorithm proceeds as follows:
1. Compute the degree matrix, D, a diagonal matrix such that $$D(i, i) = \sum_j W(i, j)$$

2. Based on D, compute a normalized weight matrix $L=D^{-1}W$
3. Find the largest K eigenvectors $u_1, u_2, \ldots, u_K$ to form matrix $U=[u_1, u_2, \ldots, u_K]$.
4. Normalize the rows of U to unit length.
5. Perform a K-means clustering on the embedded points to produce a final clustering solution, treating the rows of U as K-dimensional embeddings of the vertices in the graph.

This approach has the advantage that feature vectors are not used directly; only cluster memberships are used. This reduces the amount of data to be processed, supporting faster execution of cluster merging. Further, it avoids the somewhat complex problem of computing appropriate feature-based distances for merging clusters.

The present invention can also be practiced with any cluster merging algorithm to merge the original video frame clusters 250. In other embodiments, the merge clusters step 460 identifies the video frame clusters 250 to be merged by selecting the middle frame from each cluster, and performing a k-means clustering, such as described by Kanungo et al. in the article "An efficient k-means clustering algorithm: analysis and implementation" (IEEE Transactions on Pattern Analysis and Machine Intelligence, Vol. 24 No. 7, pp. 881-892, 2002), which is incorporated herein by reference. The k-means clustering can be based on the feature vectors 220 already used to represent each frame for forming video frames clusters 250, though other feature vectors could be formed and used for cluster merging. The advantage of this is that while random projection is efficient for determining frames that are very similar, the statistical distance between dissimilar frames may not correlate as well with human perception.

For merging clusters deemed to be statistically different, it can be advantageous to use other feature vectors. For example, image similarity metrics such as color and edge histograms, and block-based histogram correlation are well known for testing image similarity, for example as used in commonly-assigned U.S. Pat. No. 6,351,556 to Loui et al., entitled "Method for automatically comparing content of images for classification into events," which is incorporated herein by reference.

In some embodiments, other optional steps can be used within the spirit of the present invention to improve the robustness of the key video frame selection process. For example, an optional discard video frame clusters step 425 can be used to discard extremely small video frame clusters, which are less likely to contain significant scene content. In this case, a minimum cluster size (e.g., 8) can be defined, and any video frame clusters having a smaller number of video frames can be discarded. In this way, only significant video frame clusters 250 are considered for key frame selection. In some cases, a maximum cluster size (e.g., 60 frames), can also be enforced. This can eliminate video segments where no interesting action is occurring.

Returning to a discussion of FIG. 6, once the merged video frame clusters 415 have been determined, a select key frames step 420 is used to select a key video frame 265 from each of the merged video frame clusters 415. In some embodiments, the select key frames step 420 can simply select the video frame in the middle of each merged video frame clusters 415 to be used as the key video frame 265.

Figure 9A:
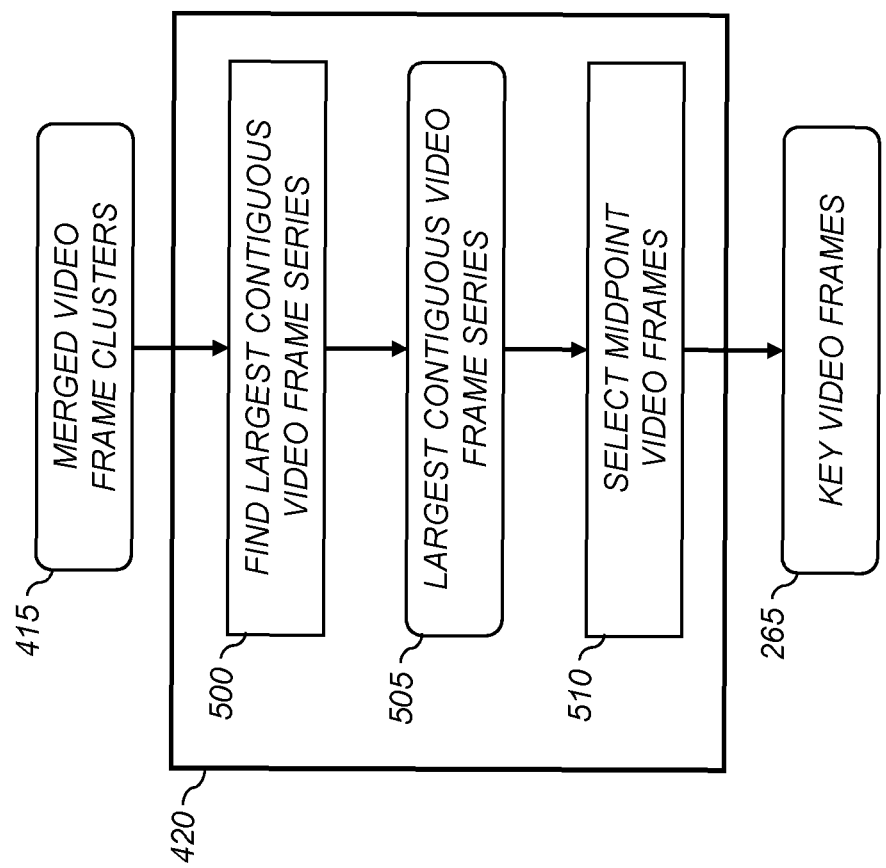
FIGS. 9A-9B are diagrams showing further detail for the select key video frames step of FIG. 6 according to various embodiments.

There is generally no requirement that the video frame clusters merged by the merge video frame clusters step 410 are temporally contiguous. For example, if a photographer pans the video camera from left to right, and later pans the video camera from right to left, covering the same scene areas at a later time, the video frame clusters having the highest similarity may correspond to noncontiguous portions of the video sequence 200 (FIG. 2). In this case, the method shown in FIG. 9A can be used to perform the select key frames step 420. A find largest contiguous video frame series step 500 is used to determine a largest contiguous video frame series 505 for each merged video frame cluster 415 (i.e., the contiguous video frame series having the largest number of video frames). A select midpoint video frames step 510 is then used to pick the video frames at the midpoints of each of the largest contiguous video frame series 505 to be the key video frames 265.

Figure 9B:
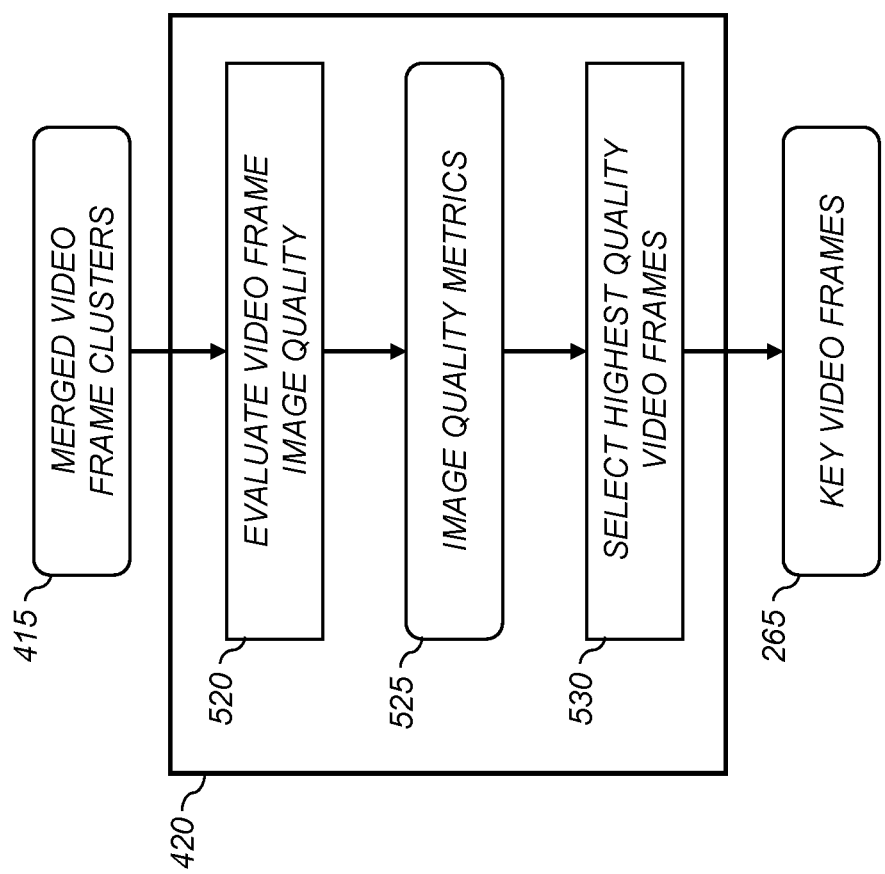

FIG. 9B shows an alternate embodiment of the select key frames step 420 in which the key video frames 265 are selected based on analyzing the image quality of the video frames. An evaluate video frame image quality step 520 determined image quality metrics 525 for each video frame in a particular merged video frame cluster 415. The image quality metrics 525 can be determined using any method known in the art. In some embodiments, the image quality metrics 525 can be determined using one of the methods described in commonly-assigned U.S. Patent Application Publication 2012/0148149 to Kumar et al., entitled "Video key frame extraction using sparse representation," which is incorporated herein by reference. A select highest quality video frames step 530 is then used to select the video frame having the highest image quality metric 525 to be the key video frame 265.

Examples of image quality attributes that can be evaluated to determine the image quality metric include detecting the presence of one or more faces in the video frame, estimating a noise level for the video frame, estimating a blur level for the video frame, and estimating a sharpness level for the video frame. Methods for determining these and other quality attributes are well-known in the art. For example, a method for detecting faces in a digital image is described by Romdhani et al. in the article "Computationally Efficient Face Detection" (Proc. 8$^{th}$ International Conference on Computer Vision, pp. 695-700, 2001); a method for estimating noise in a digital image is described by Liu et al. in the article "Noise estimation from a single image" (IEEE Conference on Computer Vision and Pattern Recognition, pp. 901-908, 2006); and a method for estimating a sharpness level for a digital image is described by Ferzli et al. in the article "A no-reference objective image sharpness metric based on just-noticeable blur and probability summation" (IEEE International Conference on Image Processing, Vol. III, pp. 445-448, 2007). Other examples of image quality attributes that would be related to image quality include detecting rapid motion changes and classifying the video frames using semantic classification algorithms. When a plurality of quality attributes are determined for a given frame, they can be combined using any method known in the art to determine the overall visual quality score for the frame. For example, the image quality attributes can be combined using a weighted summation.

Figure 10:
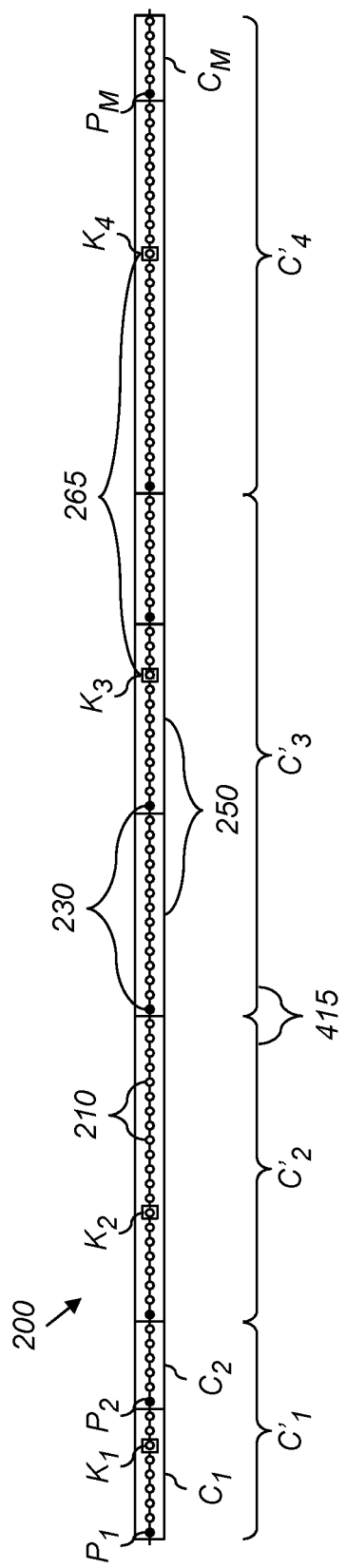
FIG. 10 is a diagram illustrating a set of key frames selected from a video sequence based video frame clusters determined using a group sparsity algorithm.

FIG. 10 shows an illustrative example of a set of four key video frames 265 ($K_1$, $K_2$, $K_3$, $K_4$) determined for a video sequence 200 having a sequence of video frames 210. The video sequence 200 is divided into a series of video frame clusters 250 ($C_1$, . . . , $C_M$) using a group sparsity algorithm, each video frame clusters 250 being determined with respect to a particular selected video frame 230 ($P_1$, . . . , $P_M$). Merged video frame clusters 415 ($C'_1$, $C'_2$, $C'_3$, $C'_4$) are formed by merging similar video frame clusters 250 until the number of clusters equals the target number of key frames 405 (in this case 4). The highest quality video frame in each of the merged video frame clusters 415 are then selected to be the key video frames 265 ($K_1$, $K_2$, $K_3$, $K_4$). (This illustrative example shows a video sequence 200 having a relatively small number of video frames 210. One skilled in the art will recognize that most actual video sequences 200 will include a much larger number of video frames.)

Figure 11:
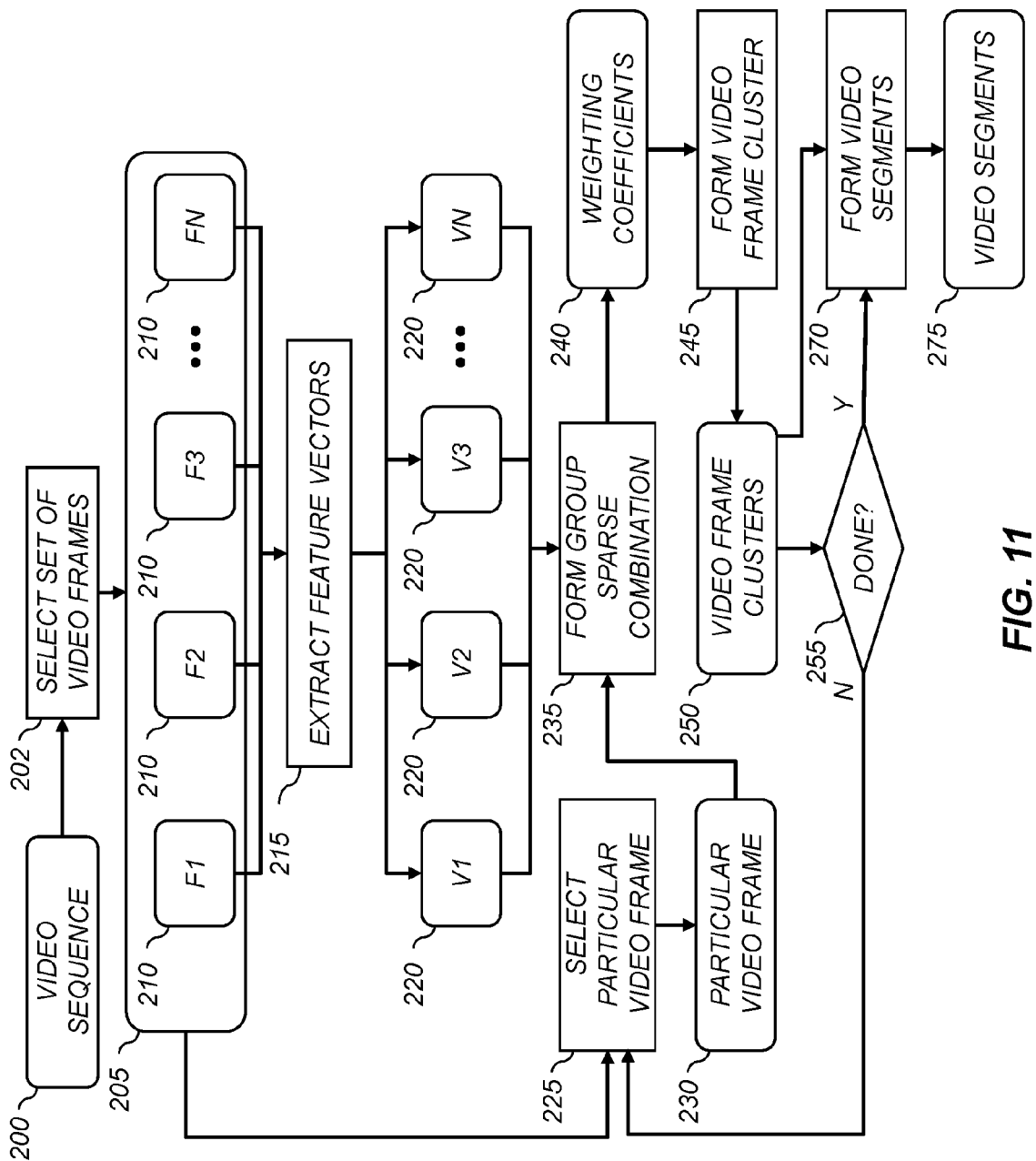
FIG. 11 is a flowchart of a method for performing video segmentation according to an embodiment of the present invention.

The above-described method for forming video frame clusters 250 using a group sparsity algorithm can also be used for other video processing methods in addition to the selection of key video frames 265. For example, FIG. 11 shows an example of a video segmentation method that breaks a set of video frames 205 into a series of video segments 275 based on video frame clusters 250 formed using group sparse combinations. The steps used to form the video frame clusters 250 are equivalent to those discussed relative to FIG. 2 during the process of forming the key video frames 265. In this case, a form video segments step 270 is used to form the video segments 275 responsive to the video frame clusters 250. Each of the video segments 275 will correspond to a "scene" within the video sequence, and will be defined by scene boundaries indicating the starting and ending video frames of the video segment 275 within the video sequence 200. Once the process is complete, an indication of the determined scene boundary locations is stored in a processor-accessible memory for use in appropriate applications. In some embodiments, the stored indication of the scene boundary locations is a pair of video frame numbers identifying the scene boundary locations of the video segments 275. The identified frame numbers can be stored in various manners. For example, they can be stored as metadata in association with a video file used to store the video sequence 200 (either within the video file or in a separate file associated with the video file). In other embodiments, the video frames in one or more of the video segments 275 can be extracted and stored as a separate video file.

Figure 12:
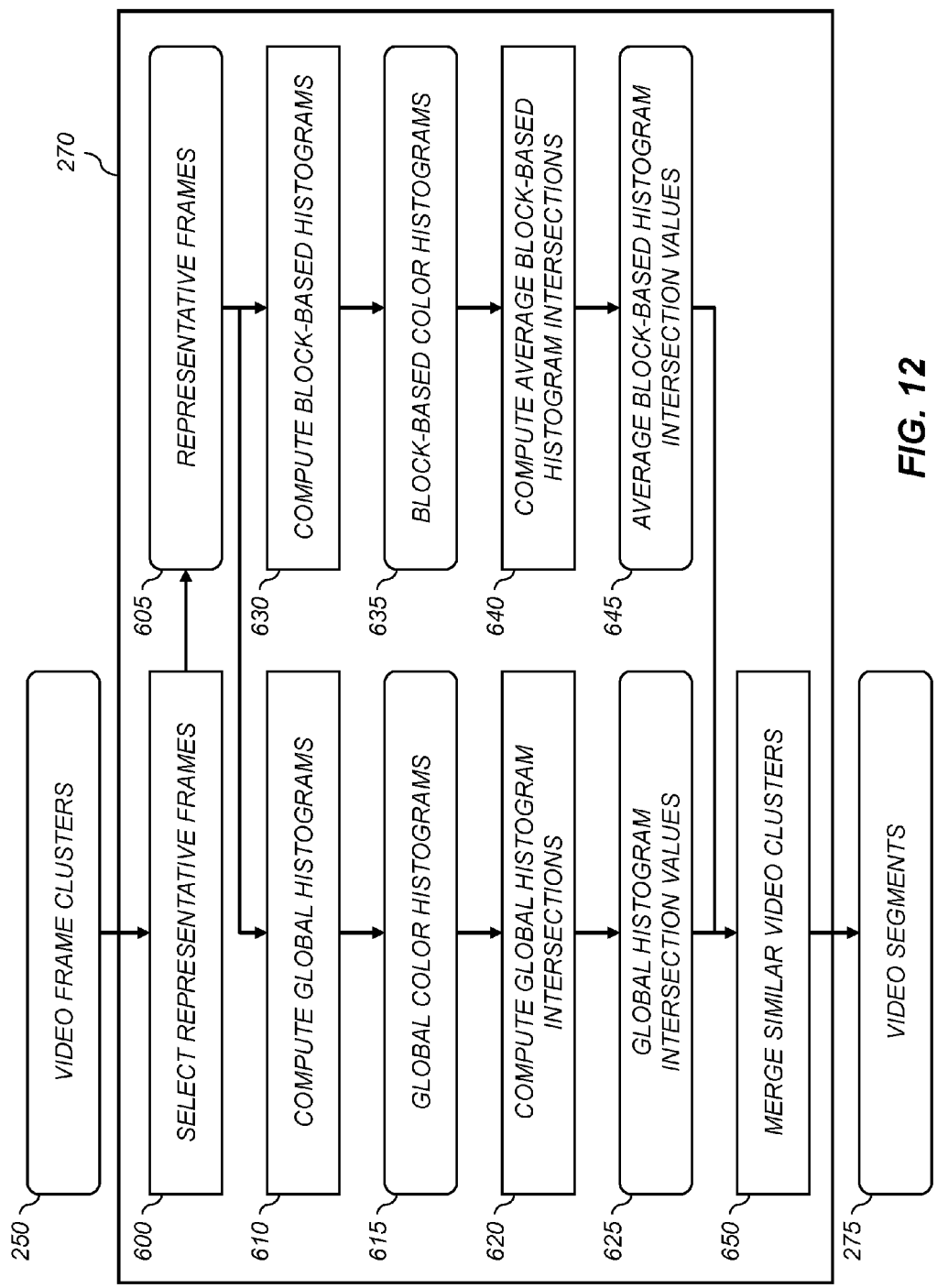
FIG. 12 is a diagram showing further detail for the form video segments step of FIG. 11.

FIG. 12 shows additional details of the form video segments step 270 in accordance with a preferred embodiment. The formation of the video frame clusters 250 in accordance with the present invention provides groups of video frames which should all be from the same video segment 275. Generally, these video frame clusters 250 will be relatively short (e.g., a few seconds or less), and a video segment 275 will generally be formed by merging a sequence of video frame clusters 250. The process shown in FIG. 12 analyzes the video frame clusters 250 to determine which ones should be grouped together to form the video segments 275.

First, a select representative frames step 600 is used to select representative frames 605 for each of the video frame clusters 250. In a preferred embodiment, a video frame closest to the center of each video frame cluster 250 is selected as the representative frame 605. Because the video frames within each video frame clusters 250 should be similar, the similarity of the video frame clusters 250 can be compared by comparing the representative frames 605.

Next adjacent video frame clusters 250 having representative frames 605 that are sufficiently similar are merged to form the video segments 275. In a preferred embodiment, the method described in the aforementioned U.S. Pat. No. 6,351,556 is used to determine the similarity between the adjacent representative frames 605.

Referring to FIG. 12, this process is briefly summarized as follows. A compute global histograms step 610 is used to compute a global color histogram 615 for each representative frame 605.

A comparison of the global color histogram 615 for pairs of adjacent video frame clusters 250 is performed by using a compute global histogram intersections step 620 to compute global histogram intersection values 625. A preferred method for computing the global histogram intersection values 625 is described in the aforementioned U.S. Pat. No. 6,351,556.

Similarly, a compute block-based histograms step 630 is used to a set of block-based color histograms 635 for each representative frame 605. In this regard, each representative frame 605 is divided into blocks of a given size (e.g., 32×32 pixels). For each block, a color histogram is computed using a process similar to that used in the compute global histograms step 610.

A comparison of the block-based color histograms 635 for pairs of adjacent video frame clusters 250 is performed by using a compute average block-based histogram intersections step 640 to compute average block-based histogram intersection values 645. A preferred method for computing the average block-based histogram intersection values 645 is described in the aforementioned U.S. Pat. No. 6,351,556. In summary, the block-based color histogram for each block in a first representative frame 605 is compared to the corresponding block of an adjacent representative frame 605, and to a set of eight neighboring blocks, to determine intersection values. (The comparison to the neighboring blocks accounts for movement of objects in the scene during the capture of the video sequence 200.) The average block-based histogram intersection value 645 for the pair of adjacent video frame clusters is then determined by computing the average of the largest intersection value for each of the blocks in the first representative frame 605.

A merge similar video clusters 650 is used to merge adjacent pairs of video frame clusters 250 where the representative frames 605 are determined to be sufficiently similar. In a preferred embodiment, to representative frames 605 are said to be sufficiently similar if the corresponding global histogram intersection value 625 is greater than a first threshold ($T_G$) and the corresponding average block-based histogram intersection value 645 is greater than a second threshold ($T_B$). It should be noted that if global histogram intersection value 625 is less than the first threshold ($T_G$), it is unnecessary to compute the average block-based histogram intersection value 645 for that pair of video frame clusters 250. In some cases, a sequence of adjacent video frame clusters 250 may all be merged if each pair of representative frames is determined to be sufficiently similar. The resulting sets of merged vide frame clusters are used for the video segments 275.

Figure 13:
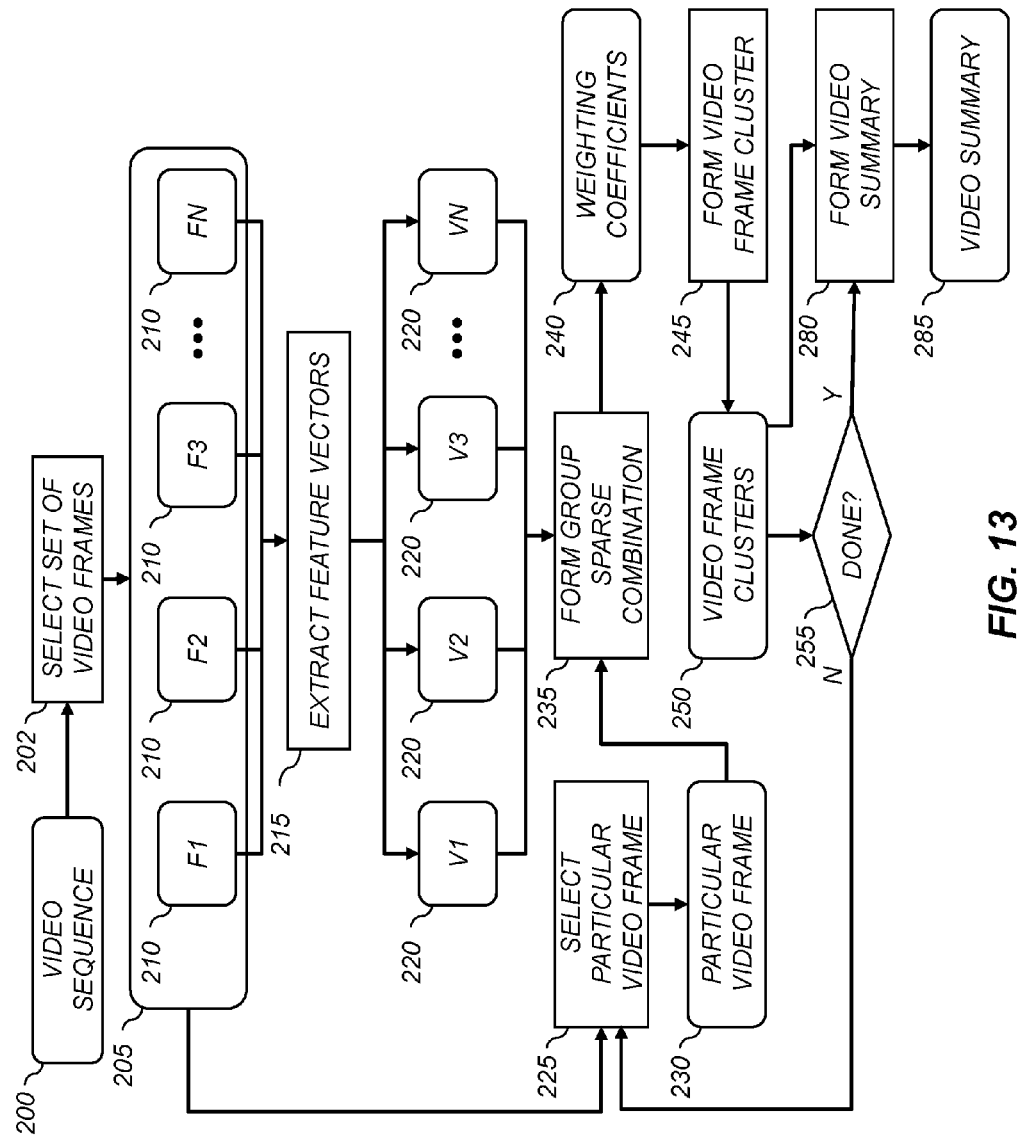
FIG. 13 is a flowchart of a method for forming a video summary according to an embodiment of the present invention.

FIG. 13 shows another example of a video processing method based on the formation of video frame clusters 250 using a group sparse combination algorithm. In this case, a form video summary step 280 is used to form a video summary 285 based on the determined video frame clusters 250. Generally, the video summary 285 will include a series of video snippets that are selected from various places in the video sequence 200. Once the video summary 285 is determined, a representation of the video summary 285 is stored in a processor-accessible memory. In some embodiments, video frames corresponding to the video summary 285 are extracted from the video sequence 200 and are used to form a video file which can be compressed and stored in a new video file. In other embodiments, metadata providing an indication of the video frames in the video sequence 200 corresponding to the video summary 285 is stored in association with the video sequence 200 (either as metadata in the video file used to store the video summary 285, or in a separate file associated with video summary 285). Optionally, indications of various transition effects that can be used to transition between the video snippets that make up the video summary 285 can also be stored as metadata associated with the digital video sequence.

Figure 14:
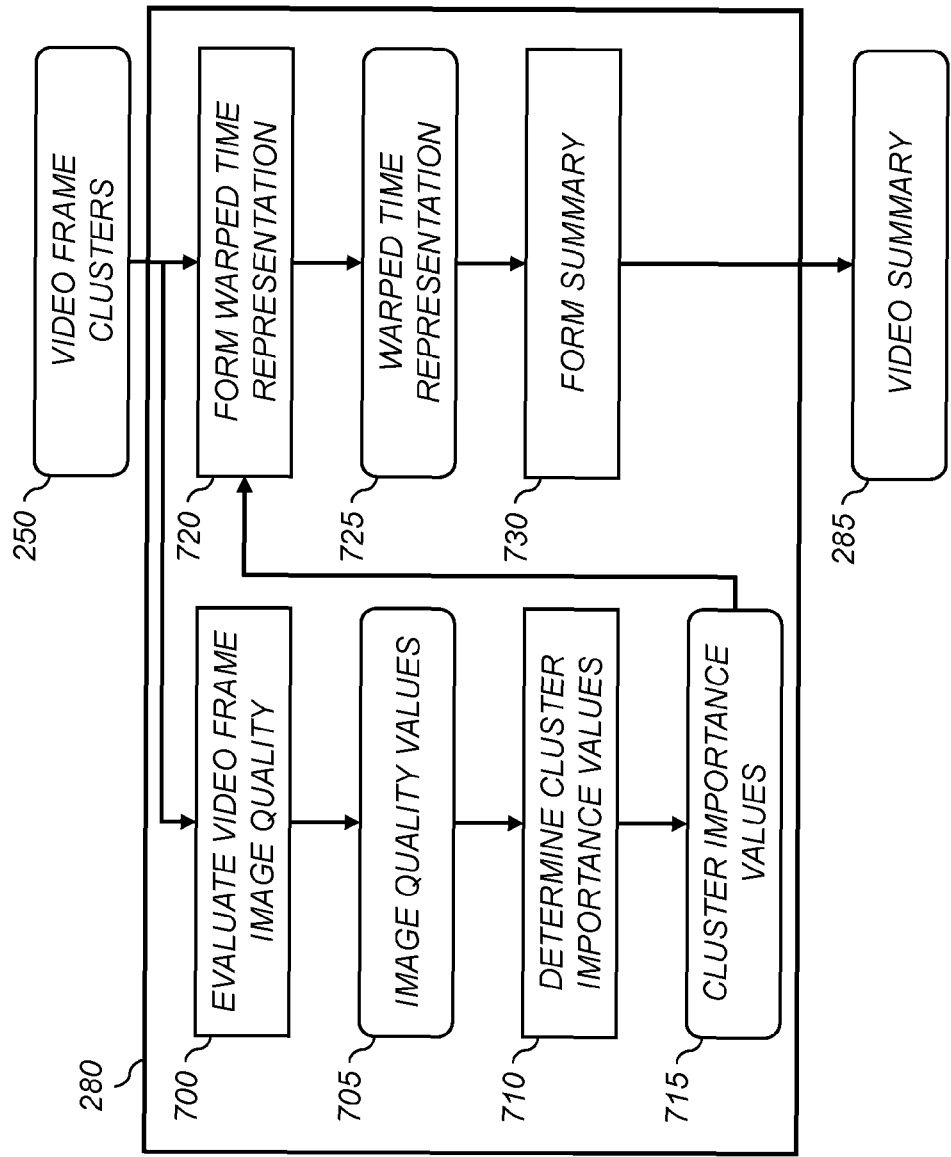
FIG. 14 is a diagram showing further detail for the form video summary step of FIG. 13.

FIG. 14 shows additional details of the form video summary step 280 in accordance with a preferred embodiment. This process is based on that described in the aforementioned commonly-assigned U.S. Patent Application 2011/0292288.

The video frame clusters 250 are analyzed using an evaluate video frame image quality step 700. In a preferred embodiment, this involves computing one or more image quality values 705 relating to various image attributes. Preferably, the image quality values 705 include image quality attributes pertaining to estimates of global and local motion for the video frames in a video frame cluster 250. The image quality values 705 can also include other image quality attributes such as sharpness, noise, colorfulness and image composition. Since all of the video frames in a particular video frame cluster 250 should have a high degree of similarity to each other, in a preferred embodiment a representative video frame (e.g., the middle video frame) is selected from each video frame cluster 250 and the video frame image quality is evaluated for only the representative video frame. Computation of the image quality values 705 for only a single video frame per video frame cluster 250 has a significant computation advantage over computing image quality values for all of the video frames. This provides a significant advantage for the method of the present invention relative to methods which rely on evaluating all of the video frames (or a regular sampling of the video frames).

The image quality values 705 are evaluated by a determine cluster importance values step 710 to determine cluster importance values 715. In a preferred embodiment, the cluster importance values are determined responsive to classifications determined for the video frame clusters 250. For example, as described in the aforementioned U.S. Patent Application 2011/0292288, the video frame clusters 250 can be classified as Zoom, Fast Pan, Inactive or Interesting depending on the determined global and local motion characteristics. Different importance values can be assigned depending on the determined classifications. In some embodiments, a Low Quality classification can also be used which is assigned a low cluster importance value 715 (e.g., zero). In some embodiments, the classifications are determined by comparing the determined image quality values 705 to appropriate thresholds. In some cases, it may be appropriate to adjust the thresholds based on the distributions of the image quality values 706 that appear in the video. For example, in a video captured with a high quality camera, a sharpness feature value may range from 0.3 to 0.9, with 0.3 representing poor focus and 0.9 representing in focus. Another video, captured with a lower quality camera, may have sharpness values ranging from 0.1 to 0.4. A fixed sharpness threshold is unlikely to provide best results for both videos. The same reasoning applies for other image quality values 705. While nominal thresholds may apply for most videos, adjustment of the thresholds to improves the ability to summarize videos with a wide range of characteristics.

A form warped time representation step 720 forms a warped time representation 725 by temporal relocation of the video frame clusters 250 responsive to the determined cluster importance values 715 as a function of time. Preferably the time representation is warped in a way that stretches the relative time duration of important clusters relative to the time duration of less important clusters. Additional details regarding the formation of the warmed time representation 725 are described in the aforementioned U.S. Patent Application 2011/0292288. Finally, a form summary step 730 determines the video summary 285 from warped time representation step 750 as will be discussed with reference to FIG. 15.

Figure 15:
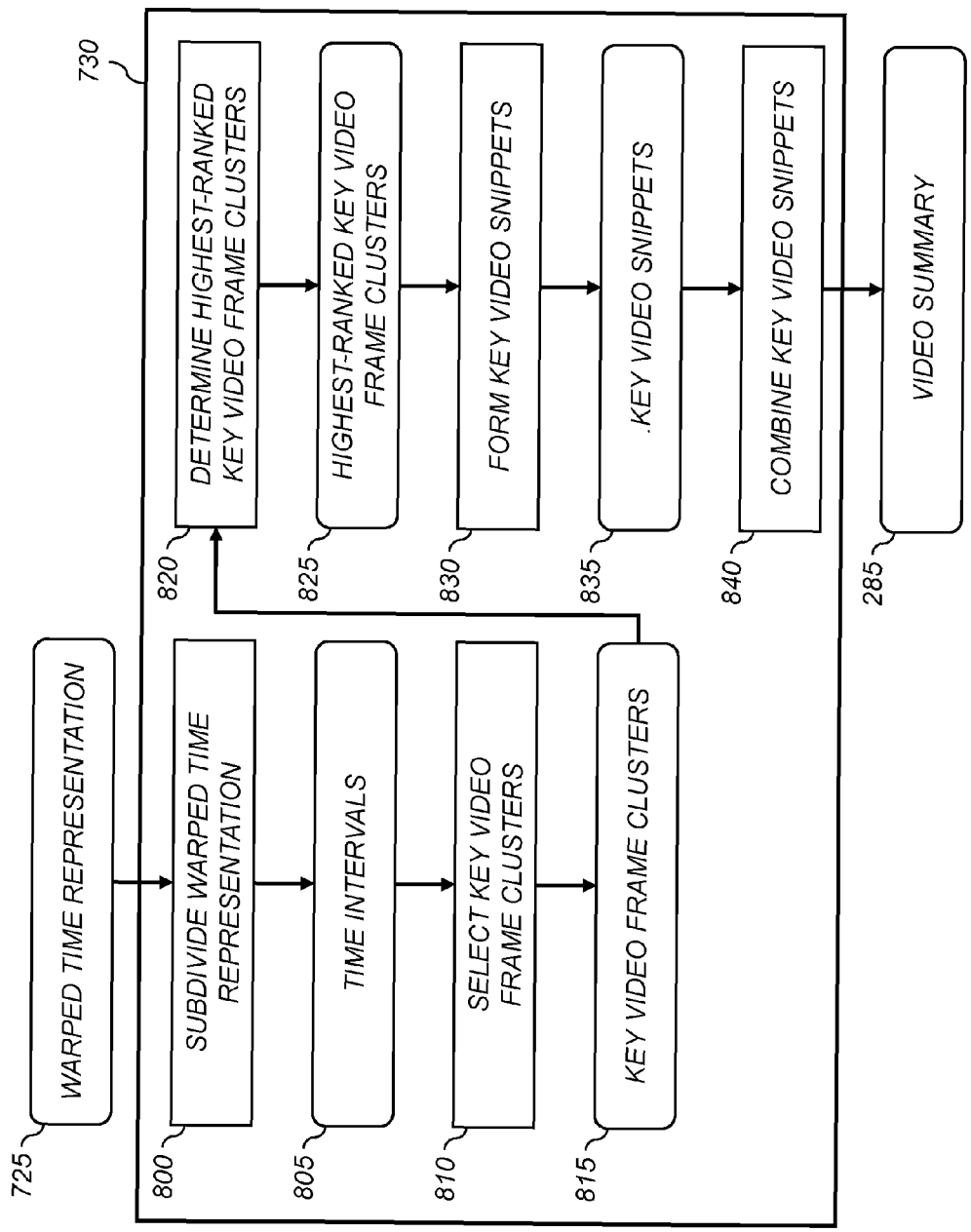
FIG. 15 is a diagram showing further detail for the form video summary from warped time representation step of FIG. 14.

FIG. 15 shows more detail regarding the form summary step 730 according to a preferred embodiment. A subdivide warped time representation step 800 is used to subdivide the warped time representation 725 into a set of equal time intervals 805. A select key video frame clusters step 810 selects a key video frame cluster 815 for each time interval 805 by analyzing the video frame clusters 250 (FIG. 14) within each time interval 805. In some embodiments, the key video frame clusters 815 are determined based on the cluster importance values 715.

A determine highest-ranked key video frame clusters step 815 ranks the key video frame clusters 815 according to a specified criterion to determine a set of highest-ranked video frame clusters 825. A form key video snippets step 830 then forms key video snippets 835 corresponding to the highest-ranked key video frame clusters 825. In some cases, the key video snippets 835 may contain only a single video frame cluster 250. More generally, the key video snippets 835 can be expanded to include other adjacent video frame cluster 250, for example, to provide a target time duration or to satisfy various criteria such as aligning the boundaries of the key video snippets 835 with lulls in the audio track. A combine key video snippets step 840 then concatenates the key video snippets 835 to form the video summary 285. The aforementioned U.S. Patent Application 2011/0292288 provides information about many other details that are pertinent for the formation of the video summary 285.

A computer program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST 110 data processing system
120 peripheral system
130 user interface system 140 data storage system
200 video sequence
202 select set of video frames step
205 set of video frames
210 video frame
215 extract feature vectors step
220 feature vector
225 select video frame step
230 selected video frame
235 form group sparse combination step
240 weighting coefficients
245 form video frame cluster step
250 video frame clusters
255 done test
260 identify key video frames step
265 key video frames
270 form video segments step
275 video segments
280 form video summary step
285 video summary
300 extract luma vector step
305 luma vector
310 define basis functions step
315 basis functions
320 determine feature vector step
330 projection matrix
400 define number of key frames step
405 target number of key frames
410 merge video frame clusters step
415 merged video frame clusters
420 select key video frames step
425 discard video frame clusters step
450 done test
460 merge clusters step
480 adjacency matrix
500 find largest contiguous video frame series step
505 largest contiguous video frame series
510 select midpoint video frames step
520 evaluate video frame image quality step
525 image quality metrics
530 select highest quality video frames step
600 select representative frames step
605 representative frames
610 compute global histograms step
615 global color histograms
620 compute global histogram intersections step
625 global histogram intersection values
630 compute block-based histograms step
635 block-based color histograms
640 compute average block-based histogram intersections step
645 average block-based histogram intersection values
650 merge similar video clusters step
700 evaluate video frame image quality step
705 image quality values
710 determine cluster importance values step
715 cluster importance values
720 form warped time representation step
725 warped time representation
730 form summary step
800 subdivide warped time representation step
805 time intervals
810 select key video frame clusters step
815 key video frame clusters
820 determine highest-ranked key video frame clusters step
825 highest-ranked key video frame clusters
830 form key video snippets step
835 key video snippets
840 combine key video snippets step

The invention claimed is:

1. A method for determining scene boundaries within a video sequence including a time sequence of video frames, each video frame including an array of image pixels having pixel values, comprising:
   a) selecting a set of video frames from the video sequence, the set of video frames comprising a starting point and an ending point;
   b) extracting a feature vector for each video frame in the set of video frames;
   c) applying a group sparsity algorithm to represent the feature vector for a particular video frame as a group sparse combination of the feature vectors for the other video frames in the set of video frames, each feature vector for the other video frames in the group sparse combination having an associated weighting coefficient, wherein the weighting coefficients for feature vectors corresponding to other video frames that are most similar to the particular video frame are non-zero, and the weighting coefficients for feature vectors corresponding to other video frames that are most dissimilar from the particular video frame are zero;
   d) analyzing the weighting coefficients to determine a video frame cluster of temporally-contiguous, similar video frames that includes the particular video frame;
   e) repeating steps c)-d) for a plurality of particular video frames to provide a plurality of video frame clusters;
   f) identifying one or more scene boundaries corresponding scenes in the video sequence based on the locations of boundaries between the determined video frame clusters; and
   g) storing an indication of the identified scene boundaries in a processor-accessible memory;
   wherein selecting a set of video frames from the video sequence comprises temporally sub-sampling the video sequence to select a subset of video frames.

2. The method of claim 1 wherein selecting a set of video frames further comprises separating the selected subset of video frames by a predefined interval.

3. The method of claim 2 wherein the predefined interval comprises an interval defined by every tenth video frame in the video sequence.

4. The method of claim 1 wherein selecting a set of video frames from the video sequence comprises using a user interface to enable a user to manually indicate the starting point and the ending point for the set of video frames.

5. A method for determining scene boundaries within a video sequence including a time sequence of video frames, each video frame including an array of image pixels having pixel values, comprising:
   a) selecting a set of video frames from the video sequence, the set of video frames comprising a starting point and an ending point;
   b) extracting a feature vector for each video frame in the set of video frames;
   c) applying a group sparsity algorithm to represent the feature vector for a particular video frame as a group sparse combination of the feature vectors for the other video frames in the set of video frames, each feature vector for the other video frames in the group sparse combination having an associated weighting coefficient, wherein the weighting coefficients for feature vectors corresponding to other video frames that are most similar to the particular video frame are non-zero, and the weighting coefficients for feature vectors corresponding to other video frames that are most dissimilar from the particular video frame are zero;
d) analyzing the weighting coefficients to determine a video frame cluster of temporally-contiguous, similar video frames that includes the particular video frame;
e) repeating steps c)-d) for a plurality of particular video frames to provide a plurality of video frame clusters;
f) identifying one or more scene boundaries corresponding scenes in the video sequence based on the locations of boundaries between the determined video frame clusters; and
g) storing an indication of the identified scene boundaries in a processor-accessible memory;
wherein the video sequence comprises a plurality of independently encoded video frames and a plurality of video frames that are encoded using inter-frame coding, and wherein selecting a set of video frames from the video sequence comprises selecting at least a subset of the plurality of independently encoded video frames.

6. The method of claim 5 wherein selecting a set of video frames from the video sequence comprises using a user interface to enable a user to manually indicate the starting point and the ending point for the set of video frames.

7. A method for determining scene boundaries within a video sequence including a time sequence of video frames, each video frame including an array of image pixels having pixel values, comprising:
a) selecting a set of video frames from the video sequence, the set of video frames comprising a starting point and an ending point;
b) extracting a feature vector for each video frame in the set of video frames;
c) applying a group sparsity algorithm to represent the feature vector for a particular video frame as a group sparse combination of the feature vectors for the other video frames in the set of video frames, each feature vector for the other video frames in the group sparse combination having an associated weighting coefficient, wherein the weighting coefficients for feature vectors corresponding to other video frames that are most similar to the particular video frame are non-zero, and the weighting coefficients for feature vectors corresponding to other video frames that are most dissimilar from the particular video frame are zero;
d) analyzing the weighting coefficients to determine a video frame cluster of temporally-contiguous, similar video frames that includes the particular video frame;
e) repeating steps c)-d) for a plurality of particular video frames to provide a plurality of video frame clusters;
f) identifying one or more scene boundaries corresponding scenes in the video sequence based on the locations of boundaries between the determined video frame clusters; and
g) storing an indication of the identified scene boundaries in a processor-accessible memory;
wherein extracting a feature vector for each video frame comprises extracting a color channel of each video frame.

8. The method of claim 7 wherein the color channel comprises a green color channel.

9. The method of claim 7 wherein the color channel comprises pixel values for a plurality of color channels.

10. The method of claim 7 wherein selecting a set of video frames from the video sequence comprises using a user interface to enable a user to manually indicate the starting point and the ending point for the set of video frames.

* * * * *